United States Patent [19]

Sasaki

[11] Patent Number: 5,026,766

[45] Date of Patent: Jun. 25, 1991

[54] HOT-BONDING SILICONE ADHESIVE COMPOSITION

[75] Inventor: Shosaku Sasaki, Chiba, Japan

[73] Assignee: Toray Silicone Company, Limited, Tokyo, Japan

[21] Appl. No.: 371,348

[22] Filed: Jun. 26, 1989

[30] Foreign Application Priority Data

Jun. 29, 1988 [JP] Japan ................................ 63-161356

[51] Int. Cl.$^5$ .............................................. C08L 83/00
[52] U.S. Cl. .................................... 524/588; 524/789; 524/847; 524/860; 524/493; 525/477
[58] Field of Search ............... 524/493, 588, 789, 847, 524/860; 525/477

[56] References Cited

U.S. PATENT DOCUMENTS

| | | | |
|---|---|---|---|
| 2,676,182 | 4/1954 | Daudt et al. | 528/39 |
| 3,528,940 | 9/1970 | Modic | 524/493 |
| 4,800,124 | 1/1989 | Davis et al. | 524/588 |

Primary Examiner—Melvyn I. Marquis
Attorney, Agent, or Firm—George A. Grindahl

[57] ABSTRACT

Hot-bonding silicone adhesive composition prepared by kneading and heating a mixture of a polydiorganosiloxane and a microparticulate silica and then adding an arbitrary amount of a solvent and an organopolysiloxane resin to the kneaded and heated mixture. The composition has substantially no tack at room temperature when freed of its solvent; however, it has high adhesive strength at elevated temperature.

6 Claims, No Drawings

HOT-BONDING SILICONE ADHESIVE COMPOSITION

BACKGROUND OF THE INVENTION

The present invention relates to a method for preparing a hot-bonding silicone adhesive composition which does not develop tack or adhesiveness at room temperature upon the removal of organic solvent but which does develop a high adhesive strength upon heating.

Silicone adhesives have an excellent tack, adhesive strength, pressure-sensitive adhesive strength, etc., at ambient temperatures. In addition, their properties such as heat resistance, cold resistance, electrical properties, etc., are those characteristic of silicones. As a consequence, they are widely used for electrical insulating tape, where a high level of reliability is essential, and in adhesives and various pressure-sensitive adhesives where thermal stability and cold resistance are critical.

As a general matter, these silicone adhesive compositions take the form of organoperoxide-curing compositions consisting of the mixture of dimethylsiloxane gum and methylpolysiloxane resin. A separate impulse in this regard are compositions which are cured by platinum-type catalysts and consist of mixtures of alkenyl group-containing diorganopolysiloxane plus organohydrogenpolysiloxane plus organopolysiloxane resin. However, the preceding adhesive compositions in each case evidence a strong tack and a high adhesive or pressure-sensitive adhesive strength at room temperature. Thus, when coated on the surface of various substrates in the production of tape-form adhesives, the problem arises that the coated surface and the back surface of the tape substrate will adhere to one another and cannot be peeled apart. A release treatment of the back surface of the tape substrate is therefore necessary in order to provide such a tape on a practical basis. Also, when a sheet-form adhesive is stacked up during storage after manufacture, it is necessary to insert a separation or release material between the adhesive-coated surface and the sheet-form substrate.

BRIEF SUMMARY OF THE INVENTION

The present invention takes as its object the introduction of a hot-bonding silicone adhesive composition which forms a film upon the removal of organic solvent which lacks tack and adhesiveness at room temperature while developing a high adhesive strength upon heating. This object, and others which will become apparent upon consideration of the following disclosure and appended claims, is obtained by the present invention which, briefly stated, relates to a hot-bonding silicone adhesive composition comprising (A) 100 weight parts organopolysiloxane compound prepared by kneading with heating (a) 60 to 90 weight parts of a polydiorganosiloxane represented by the average unit formula $R_aSiO_{(4-a)/2}$ wherein R is a monovalent hydrocarbon group and $a = 1.9$ to 2.05 and (b) 10 to 40 weight parts dry-method or wet-method silica, said heating being sufficient to increase the hot-bonding adhesive strength of the hot-bonding adhesive composition, (B) 20 to 200 weight parts organopolysiloxane resin constituted of the $R^1_3SiO_{1/2}$ unit, wherein $R^1$ is a monovalent hydrocarbon group or the hydroxyl group at least 50% of all $R^1$ being alkyl, and the $SiO_2$ unit in a molar ratio of (0.6:1.0) to (1.0:1.0), and (C) an arbitrary quantity of organic solvent sufficient to facilitate the use of the composition, and to the method for its preparation.

DETAILED DESCRIPTION OF THE INVENTION

To explain the preceding in greater detail, with regard to the polydiorganosiloxane (a) to be used in the organopolysiloxane compound constituting component (A), the group R in the above formula comprises monovalent hydrocarbon groups such as alkyl groups such as methyl, ethyl, propyl, etc.; alkenyl groups such as vinyl, allyl, propenyl, etc.; the phenyl group, and the like. The methyl group advantageously constitutes at least 95 mole % of the total groups R. Its molecular chain terminals are not particularly crucial and may be any of methyl, phenyl, vinyl, hydroxyl, etc. The molecular weight of component (a) is also not particularly crucial as long as it falls within a range which does not impair the practical useability, processability, and adhesiveness of the present invention's hot-bonding silicone adhesive composition. Generally, its molecular weight is such as to provide a viscosity for the polydiorganosiloxane which ranges from a pourable liquid to a formable gum.

The microparticulate silica comprising the component (b) used by the present invention functions to eliminate the tack and adhesiveness at ambient temperatures, and, through its co-use with component (B), functions to provide a high adhesiveness upon heating.

This component (b) encompasses the well-known dry-method silica, produced by the reaction of, for example, tetrachlorosilane, etc., in the oxyhydrogen flame, as well as the well-known wet-method silica obtained by removal of water and salt after reacting acid with waterglass. While either of dry-method silica and wet-method silica can be used in the present invention, dry-method silica is generally preferred because the corresponding adhesive strength during heating is high.

The component (A) in the present invention comprises the organopolysiloxane compound prepared by kneading the preceding components (a) and (b) with heating. The preparation of this compound is essential from the standpoint of achieving the object of the present invention. Merely simply mixing components (a) and (b) or components (a), (b), (B), and (C) results in a lessening of the adhesive strength developed upon heating the ultimately obtained composition, and the object of the present invention will not be achieved.

The method of kneading with heating is not particularly critical as long as the conditions provide for the homogeneous mixing and kneading of components (a) and (b) and achieve the object of the present invention. An exemplary method in this regard consists of adding component (b) to component (a) in the vicinity of the ambient temperature with mixing and kneading to a certain, i.e. preliminary, degree and then additionally mixing and kneading to a suitable, i.e. homogeneous, degree while heating. Another exemplary method consists of adding component (b) to component (a) with mixing and kneading to a suitable degree, followed by kneading with heating or allowing the mixture to age by standing as such while heating. The heating temperature as a general matter ranges between 100 degrees Centigrade to 220 degrees Centigrade.

Also, various plasticizers may be admixed in order to facilitate the kneading process. Such plasticizers are exemplified by low molecular-weight polydiorganosiloxane having terminal hydroxyl groups, hexamethyldisilazane, etc.

With regard to the organopolysiloxane resin comprising the component (B) used by the present invention, the group $R^1$ in the above formula represents the hydroxyl group or a monovalent hydrocarbon group as exemplified by alkyl groups such as methyl, ethyl, propyl, etc.; alkenyl groups such as vinyl, allyl, etc.; and like groups. The methyl group preferably comprises at least 95 mole % of the total groups $R^1$. In addition, it is preferred that the hydroxyl group content fall within the range of 0.01 to 5 weight %. Moreover, the $R^1_3SiO_{1/2}$ unit to $SiO_2$ unit molar ratio must fall within the range of 0.6:1.0 to 1.0:1.0. The adhesive strength declines when the $R^1_3SiO_{1/2}$ unit falls below 0.6, while the cohesive strength declines when it exceeds 1.0.

Organopolysiloxane resins, and their synthesis, are described in U.S. Pat. No. 2,676,182 which is incorporated herein by reference to teach a synthesis method for Component (B).

Component (B) is to be added at 20 to 200 weight parts per 100 weight parts organopolysiloxane compound comprising component (A). A satisfactory adhesive strength will not be obtained when this quantity of addition falls below 20 weight parts. On the other hand, in excess of 200 weight parts, cracks will be generated in the surface of the adhesive film afforded by solvent removal when the film is subjected to bending. Also, the adhesion surface undergoes a simple separation when subjected to impact.

The organic solvent comprising the component (C) used by the present invention serves to dissolve component (A) and component (B) and thus facilitate coating of the invention's adhesive composition on various substrates, and it should dissolve the polydiorganosiloxane comprising component (a) in the above component (A). Concrete examples in this regard are toluene, xylene, benzene, mineral spirits, solvent naphtha, n-hexane, n-heptane, isopropyl alcohol, perchloroethylene, trichloroethylene, etc. These organic solvents may be used singly or in mixture. Because it is best selected at the time of use, the quantity of addition of component (C) is not rigorously specified, and this component is used in arbitrary quantities.

As long as the object of the present invention is not compromised, small quantities of supplementary components may be admixed in addition to the above components (A) through (C). These supplementary components encompass, for example, various oxidation inhibitors, pigments, stabilizers, and organoperoxides. Substrates which may be used for the preparation of tape-form or sheet-form adhesive using the adhesive composition of the present invention encompass various types of materials such as plastic films of polypropylene, polyester, polytetrafluoroethylene, polyimide, etc.; paper such as synthetic paper and Japanese paper; textiles; glass wool: metal foils, etc.

The adhesive composition of the present invention as described above does not develop tack or adhesiveness at room temperature upon the removal of the organic solvent, but does develop a strong adhesiveness upon heating. As a consequence, when coated on various substrates to prepare tape-form or sheet-form adhesives, a release treatment or release material for the adhesive surface and the back surface of the substrate is no longer necessary. Thus, the adhesive composition of the present invention can provide an extremely effective adhesive.

EXAMPLES

The invention under consideration is explained in greater detail below using illustrative examples. In the examples, parts = weight parts and % = weight %. The various properties considered in the examples were measured by the following methods.

Measurement of ball tack

The hot-bonding adhesive composition was coated on the substrate surface to a thickness of 5.0 microns as solids, and an adhesive sheet was prepared by removing the organic solvent by standing for 5 minutes in a drier at 110 degrees Centigrade. This adhesive sheet was placed on a ball tack tester (from Tester Sangyo Kabushiki Kaisha) at a slope of 30 degrees with the adhesive surface facing up. Using an auxiliary track with a length of 10 cm, steel balls of various sizes were rolled down: the reported value is the diameter (in units of 1/32 of an inch) of the largest steel ball which came to a stop on an adhesive surface 10 cm in length. For example, a reported value of 10 means that the largest steel ball which could be stopped on the adhesive surface was the ball with a diameter of 10/32 of an inch.

Measurement of adhesive strength

Using a 2 kg rubber roller, an adhesive sheet prepared as described above for the ball tack measurement method was adhered on a stainless steel plate (SUS 304, polished with No. 280 water-resistant emery paper) at 25 degrees Centigrade (room-temperature bonding). Bonding was also carried out by laying the adhesive surface of the adhesive sheet on stainless steel plate as described above and hot-ironing at approximately 110 degrees Centigrade (hot bonding). After standing for 1 hour at 25 degrees Centigrade, the adhesive strength was measured by peeling at a rate of 0.3 m/minute using a tensile tester (Tensilon from the Toyo Baldwin Company). The results are reported in units of g/2.5 cm.

EXAMPLE 1

7 Parts hydroxyl-terminated dimethylpolysiloxane (viscosity = 25 centistokes at 25 degrees Centigrade) as plasticizer was added to 80 parts hydroxyl-terminated dimethylpolysiloxane. Then, after the addition and kneading of 20 parts dry-method silica with a specific surface area of 200 m$^2$/g, an organopolysiloxane compound was obtained by raising the kneading temperature to 170 degrees Centigrade and continuing to knead for 3 hours. A toluene solution of the organopolysiloxane compound was prepared by the addition with dissolution of 300 parts toluene to 100 parts of this compound. An adhesive composition, designated as Sample 1, was prepared by the addition with mixing of 50 parts methylpolysiloxane resin (constituted of $(CH_3)_3SiO_{1/2}$ units and $SiO_2$ units in a 0.7:1.0 molar ratio, hydroxyl group content = 2%) to this toluene solution. Another adhesive composition, designated as Sample 2, was also prepared by the addition with mixing of 150 parts of the above methylpolysiloxane resin to a toluene solution prepared as described above.

These adhesive compositions were respectively coated on polyester film (thickness = 38 microns), and the ball tack and adhesive strength were then measured. The obtained results are reported in Table 1.

For comparison, 100 parts of the above gum was dissolved in 300 parts toluene, and a mixture, designated as Sample 3, was prepared by the addition with dissolution of 50 parts of the above methylpolysiloxane resin to this solution. Also, 100 parts of the above gum was dissolved in 300 parts toluene, and a mixture, designated as Sample 4, was prepared by dissolving 150 parts of the above methylpolysiloxane resin into this solution. The ball tack and adhesive strength were measured as above on these samples, and these measurement results are also reported in Table 1.

TABLE 1

|  |  | Ball Tack | Adhesive Strength (g/2.5 cm) | |
|---|---|---|---|---|
|  |  |  | Room Temperature Bonding | Hot Bonding |
| Present Invention | Sample 1 | 0 | 0 | 3900 |
|  | Sample 2 | 0 | 0 | 4400 |
| Comparison Examples | Sample 3 | 24 | 2200 | 2100 |
|  | Sample 4 | 26 | 3500 | 3300 |

The invention's Samples 1 and 2 did not display tack or adhesiveness at room temperature, but developed a high adhesive strength upon heating.

EXAMPLE 2

15 Parts hexamethyldisilazane as plasticizer and 30 parts dry-method silica with a specific surface area of 200 m²/g were added and kneaded into 70 parts dimethylvinylsiloxane-terminated dimethylsiloxane-methylphenylsiloxane copolymer (viscosity at 25 degrees Centigrade=60,000 centistokes, phenyl group content=2 mole %). This was followed by a heat treatment for 3 hours at 170 degrees Centigrade while kneading to give an organopolysiloxane compound. An adhesive composition, designated as Sample 5, was prepared by dissolving 100 parts of this compound in 200 parts toluene, followed by the addition with dissolution of 100 parts methylpolysiloxane resin (constituted of $(CH_3)_3SiO_{1/2}$ units and $SiO_2$ units in a 0.8:1.0 molar ratio, hydroxyl group content=2.8%).

This was then coated on 50 micron aluminum foil, and the ball tack and adhesive strength were measured. These results are reported in Table 2.

For comparison, compositions, respectively designated as Sample 6 and Sample 7, were prepared as above, but adding 10 parts or 250 parts of the methylpolysiloxane resin. Their properties were also measured, and these results are also reported in Table 2.

TABLE 2

|  | Sample | Ball Tack | Adhesive Strength (g/2.5 cm) | | Film |
|---|---|---|---|---|---|
|  |  |  | Room Temperature Bonding | Hot Bonding |  |
| Present Invention | 5 | 0 | 0 | 3800 | No cracks |
| Comparison Examples | 6 | 5 | 150 | 130 | No cracks |
|  | 7 | 4 | 244 | 2600 | Crack development |

Sample 5, a sample of the invention, had a zero ball tack and also lacked adhesiveness at room temperature. However, it developed a high adhesive strength upon heating. In contrast to this, Sample 6 developed a low adhesive strength upon heating. Because it developed cracks upon bending, the pressure-sensitive adhesive film layer of Sample 7 was unsuitable for practical use.

EXAMPLE 3

15 Parts wet-method silica with a specific surface area of 200 m²/g was added and kneaded into 85 parts trimethylsiloxane-terminated dimethylpolysiloxane (viscosity=120,000 centistokes at 25 degrees Centigrade). This was followed by a heat treatment for 3 hours at 170 degrees Centigrade, thus giving an organopolysiloxane compound. An adhesive composition, designated as Sample 8, was prepared by the dissolution of this compound in 200 parts xylene followed by the dissolution of 30 parts methylpolysiloxane resin (constituted of $(CH_3)_3SiO_{1/2}$ units and $SiO_2$ units in a 0.7:1.0 molar ratio, hydroxyl group content=0.5%).

This adhesive composition was coated on 30 micron polypropylene film, and the ball tack and adhesive strength were measured as in EXAMPLE 1. These results are reported in Table 3. For comparison, a composition, designated as Sample 9, was prepared by dissolving 85 parts dimethylpolysiloxane as described above directly in the 200 parts xylene and by then adding the 15 parts wet-method silica as described above to this solution with mixing. The properties of this composition were measured as above, and these results are also reported in Table 3.

TABLE 3

|  |  | Ball Tack | Adhesive Strength (g/2.5 cm) | |
|---|---|---|---|---|
|  |  |  | Room Temperature Bonding | Hot Bonding |
| Present Invention | Sample 8 | 0 | 0 | 3300 |
| Comparison Examples | Sample 9 | 0 | 0 | 280 |

The adhesive composition of the present invention developed a high adhesive strength through heating, while in contrast the composition of the comparison example developed an extremely low adhesive strength through heating.

The hot-bonding silicone adhesive composition of the present invention, because it consists of components (A) through (C), and in particular because component (A) is an organopolysiloxane compound prepared by kneading with heating a specified quantity of the polydiorganosiloxane comprising component (a) and a specified quantity of the microparticulate silica comprising component (b), characteristically does not develop tack or adhesiveness at room temperature upon the removal of the organic solvent, but develops a high adhesive strength upon heating.

I claim:

1. A hot-bonding silicone adhesive composition comprising
   (A) 100 weight parts organopolysiloxane compound prepared by kneading with heating
      (a) 60 to 90 weight parts of a polydiorganosiloxane represented by the average unit formula $R_aSiO_{(4-a)/2}$ wherein R is a monovalent hydrocarbon group and a=1.9 to 2.05, and
      (b) 10 to 40 weight parts dry-method or wet-method silica, said heating being sufficient to increase the hot-bonding adhesive strength of the hot-bonding adhesive composition, (B) 20 to 200 weight parts organopolysiloxane resin constituted of the $R^1{}_3SiO_{1/2}$ unit wherein $R^1$ is a monovalent hydrocarbon group or the hydroxyl group, at least 50% of all $R^1$ being alkyl, and the $SiO_2$ unit in a molar ratio of (0.6:1.0) to (1.0;1.0), and (C) an arbitrary quantity of organic solvent sufficient to facilitate the use of the composition.

2. A hot-bonding silicone adhesive composition according to claim 1 wherein said heating was done at a temperature of from 100 to 200° C.

3. A hot-bonding silicone adhesive composition according to claim 1 wherein a plasticizer was admixed with the polydiorganosiloxane (a) in order to facilitate the kneading process.

4. A method for preparing a hot-bonding silicone adhesive composition, said method comprising (A) kneading with heating a mixture of
  (a) 60 to 90 weight parts of a polydiorganosiloxane represented by the average unit formula $R_aSiO_{(4-a)/2}$ wherein R is a monovalent hydrocarbon group and $a = 1.9$ to 2.05, and
  (b) 10 to 40 weight parts dry-method or wet-method silica, said heating being sufficient to increase the hot-bonding adhesive strength of the hot-bonding adhesive composition, (B) mixing with 100 weight parts organopolysiloxane compound prepared in step (A) 20 to 200 weight parts organopolysiloxane resin constituted of the $R^1{}_3SiO_{1/2}$ unit wherein $R^1$ is a monovalent hydrocarbon group or the hydroxyl group, at least 50% of all $R^1$ being alkyl, and the $SiO_2$ unit in a molar ratio of (0.6:1.0), and (C) an arbitrary quantity of organic solvent sufficient to facilitate the use of the composition.

5. A method according to claim 4 wherein said heating is done at a temperature of from 100 to 220° C.

6. A method according to claim 4 wherein a plasticizer is admixed with the polydiorganosiloxane (a) in order to facilitate the kneading process.

* * * * *